(12) United States Patent
Spencer et al.

(10) Patent No.: US 11,578,780 B2
(45) Date of Patent: Feb. 14, 2023

(54) HIGH SPEED FLYWHEEL

(71) Applicant: Spencer Composites Corporation, Sacramento, CA (US)

(72) Inventors: Zachary B. Spencer, Sacramento, CA (US); Brian E. Spencer, Sacramento, CA (US)

(73) Assignee: SPENCER COMPOSITES CORPORATION, Sacramento, CA (US)

( * ) Notice: Subject to any disclaimer, the term of this patent is extended or adjusted under 35 U.S.C. 154(b) by 0 days.

(21) Appl. No.: 16/908,721

(22) Filed: Jun. 22, 2020

(65) Prior Publication Data

US 2021/0054903 A1 Feb. 25, 2021

Related U.S. Application Data

(60) Provisional application No. 62/867,460, filed on Jun. 27, 2019.

(51) Int. Cl.
| | | |
|---|---|---|
| *F16F 15/30* | (2006.01) | |
| *H02K 7/02* | (2006.01) | |
| *F16F 15/305* | (2006.01) | |

(52) U.S. Cl.
CPC .... *F16F 15/305* (2013.01); *F16F 2224/0241* (2013.01); *F16F 2232/02* (2013.01); *F16F 2234/02* (2013.01); *H02K 7/02* (2013.01); *Y10T 74/212* (2015.01)

(58) Field of Classification Search
CPC .. F16F 15/30; F16F 15/305; F16F 2224/0241; F16F 2232/02; F16F 2234/02; H02K 7/02; H02K 7/025; Y10T 74/2119; Y10T 74/212; Y10T 74/2121
See application file for complete search history.

(56) References Cited

U.S. PATENT DOCUMENTS

| | | | | |
|---|---|---|---|---|
| 3,788,162 | A | * 1/1974 | Rabenhorst | ............... B32B 7/12 |
| | | | | 74/572.12 |
| 4,000,665 | A | * 1/1977 | Rabenhorst | ............. F16C 15/00 |
| | | | | 74/572.12 |
| 4,023,437 | A | * 5/1977 | Rabenhorst | ........... F16F 15/305 |
| | | | | 74/572.12 |

(Continued)

FOREIGN PATENT DOCUMENTS

| | | | |
|---|---|---|---|
| CN | 203770524 U | * | 8/2014 |
| GB | 2 297 371 A | | 7/1996 |

(Continued)

OTHER PUBLICATIONS

International Search Report and Written Opinion dated Oct. 9, 2020, in International Patent Application No. PCT/US2020/038993, 31 pages.

*Primary Examiner* — Adam D Rogers
(74) *Attorney, Agent, or Firm* — Squire Patton Boggs (US) LLP

(57) ABSTRACT

The invention herein relates to a flywheel capable of high speed rotational operation in excess of 15,000 rpm, the flywheel comprising a composite rotor having a polymeric matrix in which are embedded fibers helically wound at an initial angle with respect to the axis of rotation of the rotor of from about 50° to about 80° and increasing in a stepwise or continuous manner to about 90°.

10 Claims, 5 Drawing Sheets

(56) References Cited

U.S. PATENT DOCUMENTS

| | | | | |
|---|---|---|---|---|
| 4,052,913 A | * | 10/1977 | Schultz | F16F 15/305 |
| | | | | 74/572.12 |
| 4,207,778 A | * | 6/1980 | Hatch | F16C 15/00 |
| | | | | 428/113 |
| 4,359,912 A | * | 11/1982 | Small | F16F 15/305 |
| | | | | 29/452 |
| 5,285,699 A | * | 2/1994 | Walls | H02K 39/00 |
| | | | | 74/572.12 |
| 5,692,414 A | | 12/1997 | Gregoire | |
| 5,778,735 A | * | 7/1998 | Groves | G05G 1/10 |
| | | | | 74/572.12 |
| 5,816,114 A | * | 10/1998 | Gregoire | F16F 15/305 |
| | | | | 74/572.12 |
| 9,816,583 B2 | * | 11/2017 | Baumer | F16F 15/305 |
| 10,393,224 B2 | * | 8/2019 | Otremba | H02K 7/025 |
| 2015/0345541 A1 | | 12/2015 | Sonnen et al. | |
| 2016/0329776 A1 | | 11/2016 | Ha | |
| 2019/0040933 A1 | | 2/2019 | Otremba | |

FOREIGN PATENT DOCUMENTS

| | | | | |
|---|---|---|---|---|
| GB | 2504216 A | * | 1/2014 | F16F 15/305 |
| JP | 2003-276096 A | | 9/2003 | |
| WO | WO 2002/01311 A1 | | 1/2002 | |

* cited by examiner

HIGH SPEED FLYWHEEL

CROSS-REFERENCE TO RELATED APPLICATION

The present application is a Non-Provisional U.S. patent application which claims priority under 35 U.S.C. § 119(e) to U.S. Provisional Patent Application No. 62/867,460, filed on Jun. 27, 2019, entitled "HIGH SPEED FLYWHEEL", which is hereby incorporated by reference in entirety for all purposes.

FIELD

This invention is directed to a flywheel capable of operation at high speed without precision balancing.

BACKGROUND

Flywheels date from antiquity. Heavy stone kick wheels were used in conjunction with potters wheels thousands of years ago to maintain relatively stable rotational speed of the potting table. More recently, flywheels were integral components of the earliest steam engines at the start of the industrial revolution. Even today, flywheels remain essential components of modern internal combustion engines. For these uses, the primary concern was not how much total energy can be put into the flywheel or how much can be extracted before the flywheel had to be recharged since energy was continuously being added to the flywheel by the potter's foot kicking the flywheel, the power generated by the steam engine and the combustion of fuel in the internal combustion engine. Thus, traditional flywheels tended to be relatively massive and rotationally slow.

A key property of flywheels is the amount of kinetic energy that can be contained therein. This is given by the formula $W = \frac{1}{2} I \omega^2$ where W represents kinetic energy, I is the moment of inertia of the mass of the flywheel around the center of rotation and $\omega$ is the angular velocity. This means that the largest factor in determining the amount of energy contained in a flywheel is determined predominantly by the rotational speed of the flywheel and not its weight. This property, coupled with the simplicity and extreme functional lifespan of flywheel devices has given rise to the concept of using flywheels as energy storage devices for future delivery as electrical energy, that is, as electromechanical batteries.

The many advantages of electromechanical batteries over conventional electrochemical batteries have been amply discussed in the literature and need not be further elucidated here. What bears noting, however, is that the superiority of electromechanical batteries is predominantly dependent on the flywheel. As mentioned above, the energy stored in a flywheel increases with the square of the angular velocity but only linearly with increased weight of a flywheel. Thus, lighter, faster flywheels can provide a much higher weight energy density than conventional heavy flywheels; that is, to achieve maximum energy density from a flywheel-based device, the faster the flywheel rotates, the better. There are, however, limitations on just how fast a flywheel can rotate and thus limitations on the amount of energy that can be stored.

Conventional materials—wood, stone, virtually any metal—at high rotational speeds become unusable due to low strength to density ratios. At very high rotational speeds, centrifugal force suffices to cause these materials to literally fly apart, disintegrate, with potentially catastrophic consequences. The advent of composite materials has, however, substantially alleviated this concern. In fact, a prime element in the development of composite flywheels has been the safety factor. Composite flywheels have been shown to fail in a substantially less spectacular fashion than conventional material in that composites tend to unravel rather than disintegrate into shrapnel-like shards. Thus, composite flywheels are much more containable in case of failure.

While composite flywheels have been known and studied for over 45 years, room exists for improvement. Composites remain expensive compared to other materials. A substantial portion of the expense is that most composite flywheels, like their non-composite counterparts, require careful balancing to avoid vibrational problems that can lead to failure. Further, as noted above, composites do fail and in general such failure often occurs well before the ultimate tensile strength of the fiber used is reached due primarily to flaws in the manufacturing process, thus negating some of the potential advantage of composites. That is, early failure limits the maximum sustainable rotational speed of composite flywheels and, as noted previously, rotational speed is the prime factor in the amount of energy that can be stored. In addition, current composite flywheels tend to be relatively small due to manufacturing issues whereas to achieve ultimate performance in high rotational speed uses, physical size, combined with light weight, has been a much sought-after goal.

What is needed then is a composite flywheel that can be operated at or near the ultimate tensile strength of the fiber(s) in the composite, that requires little or no balancing and that can be made in larger sizes while avoiding the problems afflicting current composite flywheel manufacturing. The current invention achieves these goals.

SUMMARY

Thus, this invention is directed to a flywheel, comprising:
a composite annular rotor having a central axis of rotation perpendicular to the rotor, wherein:
 the composite comprises a matrix material in which fibers are embedded at a concentration of about 50% to 80% by volume, the fibers being helically wound at an initial angle of about 50° to about 80° relative to the axis of rotation, the winding angle increasing to about 90° in a continuous or a stepwise manner; wherein the fibers comprise:
  a single chemical composition within a first chemical class of fiber; or
  variable chemical compositions within a first chemical class of fiber; or
  a first chemical class of fiber, which may comprise a single chemical composition or variable chemical compositions, wound to a predetermined rotor dimension whereupon a second chemical class of fiber, which may comprise a single chemical composition or variable chemical compositions, is introduced either gradually or all at once.

In an aspect of this invention, the flywheel of this invention comprises a hub at the axis of rotation, the hub being coupled to the rotor.

In an aspect of this invention, the hub is coupled to the rotor by a radially extending disc.

In an aspect of this invention, the hub is coupled to the rotor by a plurality of radially extending spokes.

In an aspect of this invention, the matrix comprises a thermoplastic or a thermoset polymer.

In an aspect of this invention, the matrix comprises a thermoset polymer selected from the group consisting of epoxy resins, polyester, polyurethanes, urea formaldehyde resins, polyimides and cyanate resins.

In an aspect of this invention, the first fiber comprises fiberglass fiber.

In an aspect of this invention, the first fiber comprises carbon fiber.

In an aspect of this invention, the first fiber comprises fiberglass fiber and the second fiber comprises carbon fiber.

In an aspect of this invention, the first fiber comprises carbon fiber and the second fiber comprises fiberglass fiber.

DETAILED DESCRIPTION

Brief Description of the Figures

FIG. 1A is a top view of the embodiment showing a rotor coupled to a hub using spokes. FIG. 1B illustrates an embodiment of this invention in which a rotor is coupled to a hub using U-shaped constructs. FIG. 1C illustrates an embodiment of this invention in which a rotor is coupled to a hub using a solid disc construct or, in the alternative, where the disc comprises a central hole that substitutes for a hub. FIG. 1D illustrates an embodiment of this invention in which a rotor is coupled to a dome-shaped construct with a central hole.

DISCUSSION

Figure 1A:
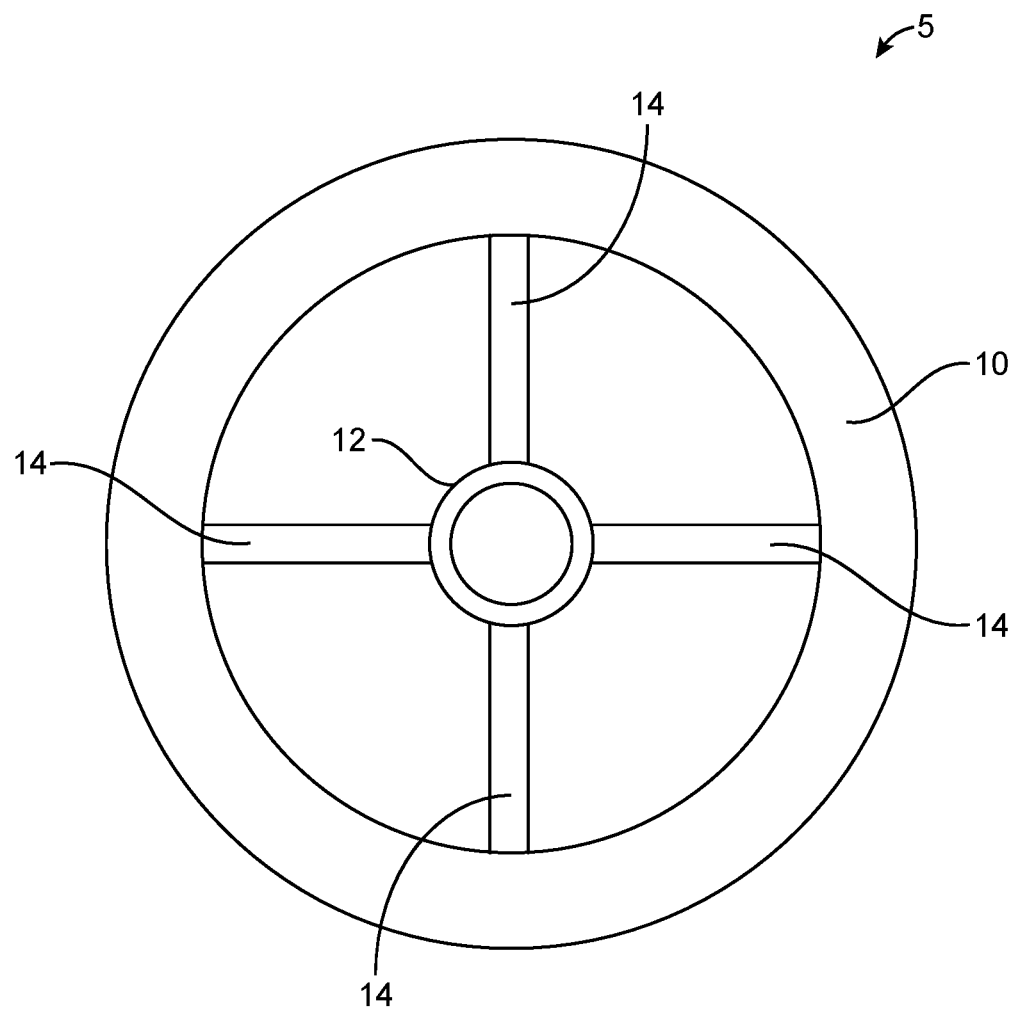
FIGS. 1A-1D illustrate an embodiment of this invention.
Figure 1B:
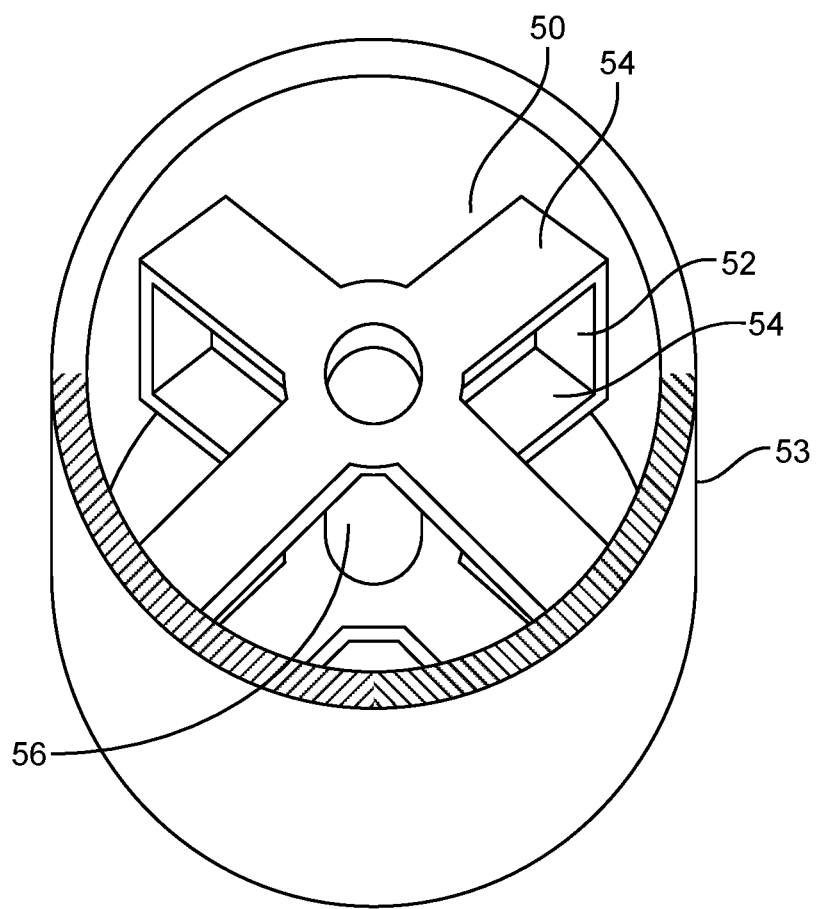

It is understood that, with regard to this description and the appended claims, reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like, mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the word or phrase unmodified by the term of approximation. In general, but with the preceding discussion in mind, a numerical value herein that is modified by a word of approximation may vary from the stated value by ±10%, unless expressly stated otherwise.

As used herein, the use of "preferred," "preferably," "more preferred," and the like refers to preferences as they existed at the time of filing of this patent application.

As used herein, a "high-speed" flywheel refers to a flywheel capable of rotational speeds in excess of 15,000 rpms. All references simply to a flywheel in this disclosure refers particularly to such high-speed flywheels but also includes slower speed flywheels, which will also benefit from the teachings of this invention.

It should be noted that the mass element of a flywheel herein is called a "rotor." In some literature, the mass element is called a "rim." When the mass element comprises one material or several materials wherein it is not possible to readily delineate separate layers of material, "rotor" and "rim" are essentially identical. Where separate layers are distinguishable, then each separate layer can be termed a "rim" and the combination of all rims in a mass element would be a "rotor."

FIG. 1 illustrates exemplary flywheel 5 of this invention. FIG. 1A shows flywheel 5, annular rotor 10 and hub 12, which defines central hole 18 and which is shown coupled to rotor 10 by spokes 14. The number of spokes 14 shown in FIG. 1A is four but any number may be used and such number is deemed within the scope of this invention. When using spokes, hub 12 is generally a separate element, it most often being a cylindrical element resembling a short section of piping. The spokes are then coupled individually to hub 12 at one end of the spoke and to rotor 10 at the other end of the spoke. The spokes may be of any shape, for example without limitation, circular, oval, rectangular, square or multi-sided in cross-section. Spokes may also not be of uniform dimension as they traverse from the rotor to the hub. That is, a spoke may be, without limitation, wider at the end that couples with the wall of the rotor and narrower at the end that couples to the hub. Spokes may take a variety of geometric shapes that involve the entire spoke and not merely the cross-sectional shape etc. One example, without limitation, of such a spoke would be U-shaped construct 50 in which base 51 of the U is contiguous with inside wall 52 of rotor 53 and the ends of arms 54 of the U are contiguous with hub 56 as shown in FIG. 1B. The spokes may be constructed of any material shown to be capable of withstanding the forces imposed on them when the flywheel is in operation. When the flywheel is intended for use in a high rotational speed electromechanical battery, a presently preferred use of a flywheel of this invention, the spokes would preferably be constructed of the same composite used to construct the rotor of the flywheel.

Figure 1C:
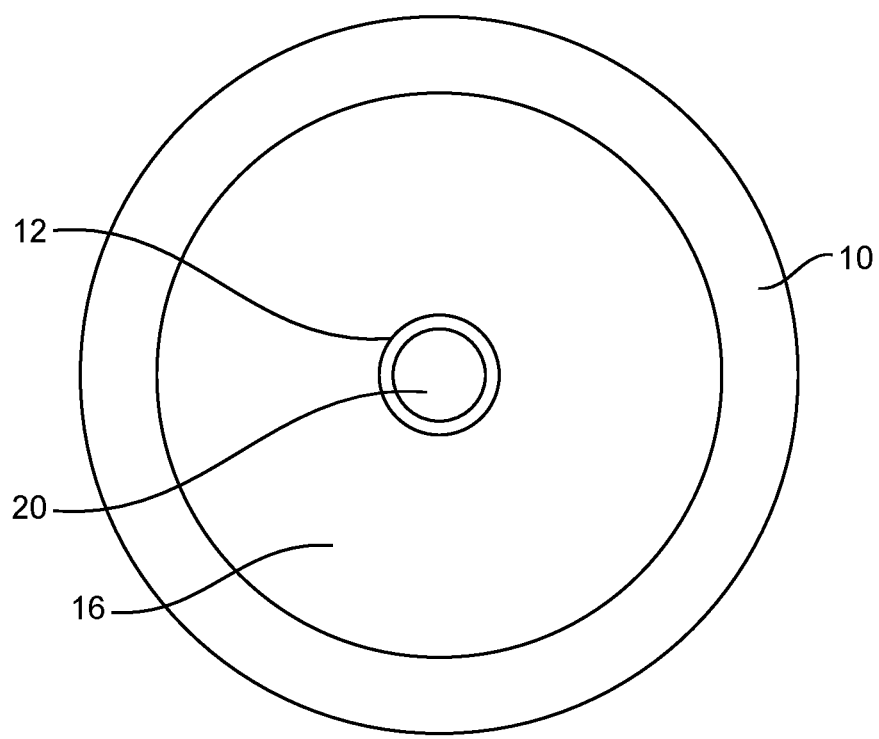
Figure 1D:
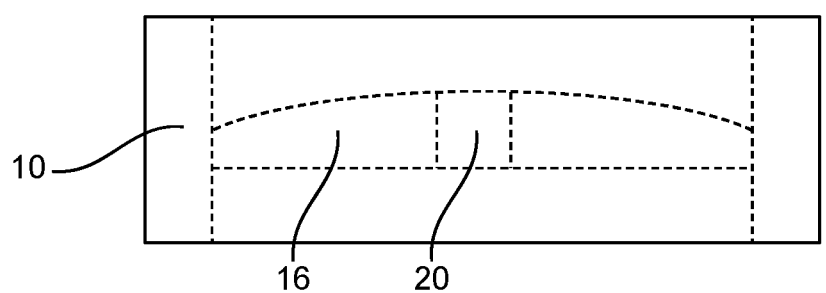

Another approach to coupling the rotor to the hub is to couple rotor 10 to hub 12 using disc-shaped member 16 as shown in FIG. 1C. In this variation, hub 12 (not shown) may take the same form as that described above, essentially a short piece of piping. Hub 12 then has an outer diameter slightly smaller than the diameter of hole 20 in disc 16 such that it can be inserted into hole 20 and the contiguous outer diameter surface of the hub can be securely fastened to the inner surface of disc 16 that defines hole 20. While disc 16 in FIG. 1D is shown as a solid planar element, it may comprise other forms. For example, without limitation, it may include holes or slots in its surface or the surface may be undulate rather than planar. The disc may also be domed as shown in FIG. 1D. A separate hub may not be present at all. In such a construct central hole 20 provides the essential element of a "hub," that is, a conduit through which other elements of an electromechanical battery may pass without contacting the flywheel in any manner. For example, with regard to an express ultimate use of a flywheel of this invention, a high rotational speed electromechanical battery, a central passageway is essential for the passage of a stator, an element of an electric motor/generator, through the rotor assembly without contacting it. In such a device the rotor assembly is in fact stably levitated around the stator by magnetic means, central hole 20 functioning primarily as part of a centering mechanism and as a safety element.

Figure 2:
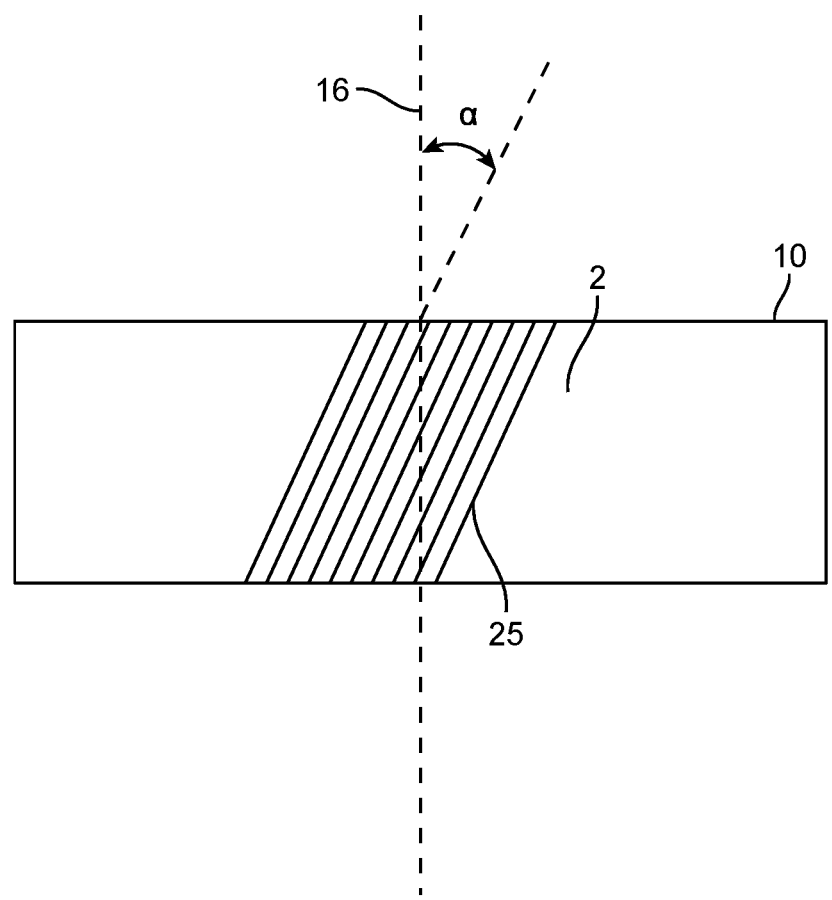
FIG. 2 illustrates a side view of a rotor comprising a composite comprising a fiber-containing matrix wrapped at a variable angle with the axis of rotation of the rotor.

FIG. 2 shows a side view of rotor 10 which is comprised of matrix material 21 in which filaments 25 are embedded at a volume concentration of about 50% to about 80% filament and are helically wound starting at an initial angle α of about 50° to about 80° relative to axis of rotation 16, the angle being increased stepwise or continuously to approximately 90° whereupon the filaments would be hoop-wound, the final stage of winding. When a desired thickness of final hoop-winding is achieved, the rotor is complete and winding ceased.

With regard to filaments 25, they may derive from several different chemical classes of material. Presently preferred are the fiberglass chemical class of fibers and the carbon fiber chemical class of fibers. For example, without limitation, the first filament wound at the outset of rotor formation can comprise a fiber of the fiberglass chemical class. The exact chemical composition of the fiberglass can vary depending on the specific modulus (modulus/density) and specific strength (modulus/strength) desired in a particular region of the rotor, which, in turn will depend largely on the intended operating rotational speed of the rotor. For example, without limitation, the fiberglass could be E-glass (aluminoborosilicate) fiberglass, A-glass (alkali-lime with little or no boron oxide) fiberglass, E-CR-glass (aluminolime silicate with less than 1% w/w alkali oxides) fiberglass, C-glass (alkali-lime glass with high boron oxide content) fiberglass, D-glass (borosilicate glass) fiberglass, R-glass (alumino silicate glass without magnesium oxide and calcium oxide (R=reinforcement) fiberglass, S-glass (aluminosilicate glass with calcium oxide but high magnesium oxide content for high tensile strength) fiberglass or any other composition of glass that may find its way into fiberglass fibers. A single chemical composition of fiberglass may comprise the entire rotor. Or a first chemical composition fiberglass may be used for a certain thickness of the rotor and then a second chemical composition fiberglass may be introduced gradually or all at once. If so desired additional chemical composition fiberglasses may be introduced sequentially when a desired thickness of a prior chemical composition fiberglass is reached. When fiberglass is used in the manufacture of a flywheel of this invention, it is presently preferred that the fiber glass be E-glass.

In the above discussion it is stated that a change in the chemical composition of fiberglass may be made gradually or all at once. All at once is, of course, self-explanatory. The filaments being wound on the forming rotor are simply supplanted in toto by another filament of a different chemical composition or chemical class. For gradual introduction of a change in filament chemical composition, it must first be understood that filament winding is accomplished using a pay-out head that delivers filaments onto a spinning mandrel. The guide plate and pay-out head (see FIG. 3) generally deliver a plurality of filaments simultaneously in a construct called a "tow", see below, with anywhere from as few as 10 filaments to as many as 30,000, 60,000 or even more filaments at once. To "gradually" substitute one chemical composition or class of fiber for another it is merely necessary to substitute some but not all of the filaments being delivered by the pay-out head with the other class or composition of fiber. The percent change in overall fiber chemical composition will depend on how many of the new chemical composition filaments are introduced into the pay-out head at any given time.

The above discussion is directed to the use of fiberglass in a flywheel of this invention. Another fiber, one that is presently preferred, is carbon fiber. As the name suggests, carbon fiber is a fiber comprised mainly of carbon atoms. Individually, carbon fibers are extremely small, each fiber comprising a cylinder having a diameter of 5-10 micrometers but the individual fibers are generally combined by the thousands in a tow. Such tows are readily wound on reels and can be conveniently unwound therefrom for use. It is tows that are delivered by the pay-out head to the spinning mandrel for the purpose of creating a rotor for a flywheel of this invention. As with fiberglasses, a single composition of carbon fiber may be used to form an entire rotor herein and a flywheel with such a rotor is within the scope of this invention. Carbon fibers, however, are unique in that very large changes in physical properties can be instilled in the fibers depending primarily on heat treatment processes used to form the fibers. For example, carbon fibers heated to 1500-2000° C. exhibit very high tensile whereas carbon fibers heated to 2500-3000° C. exhibits a higher modulus of elasticity. By varying the treatment temperature, carbon fibers exhibiting a broad range of properties can be prepared and used in this invention. As mentioned previously, a single chemical composition of carbon fiber can be used to manufacture a flywheel of this invention. The tremendous variation in properties of carbon fibers, however, can be put to beneficial use by substituting carbon fibers with differing properties into the winding process as the requirements of the developing rotor dictate. While not a true change in chemical composition when dealing with carbon fibers, for the purpose of this invention the changes in the relationship of the carbon atoms in the fibers which give rise to the differing physical properties is to be understood as a use of carbon fibers of "variable chemical composition." It is noted that even greater variations in physical and chemical properties of carbon fibers may be achieved by the introduction of carbon nanotubes into the fiber. Carbon nanotube containing carbon fibers for use in the manufacture of flywheels are within the scope of this invention.

It is also entirely possible and well within the scope of this invention to begin the manufacture of a rotor of this invention using either fiberglass fibers or carbon fibers and then introducing all at once or gradually fibers of the other chemical class into the winding.

The exact composition of the fibers being wound at any particular time is determined by finite element analysis, which serves to optimize elastic modulus and strength of the rotor being formed as the fibers are wound on a mandrel. The fibers can be wound in a stepwise fashion in which changes in the fiber composition occur in relatively instantaneous fashion in easily measurable increments. In such case, the thickness of each increment may be thought of as a separate rim with multiple such rims being superimposed to form the final rotor.

It is presently preferred, however, that changes in the composition of the fibers being wound occur continuously and gradually such that no abrupt easily recognizable change in composition is observed. In this instance, the rotor and a rim relate to the same construct.

The matrix used to form a composite of this invention may comprise a broad spectrum of materials. Presently preferred are polymeric materials which may be thermoplastic or thermosetting. Thermosetting polymers are presently preferred because they may be cured by heat treatment during fiber application to a forming rotor on a mandrel thereby avoiding or at least mitigating structural problems with the final rotor caused by movement of the fibers after application. Examples, without limitation, of thermosetting polymer are epoxy resins, urea formaldehyde resins, polyurethanes, polyesters, cyanate esters and polyimides. Non-organic materials such as a ceramic matrix may also be used if the ceramic is modified to render it less brittle.

Figure 3:
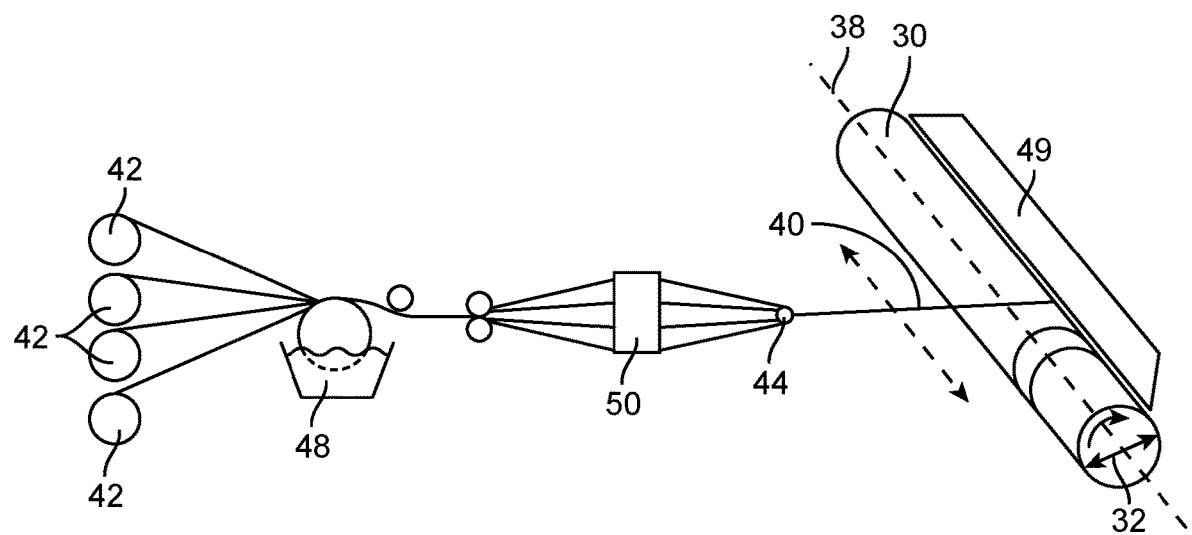
FIG. 3 illustrates a generic process for winding a fiber-containing matrix on a mandrel to produce a rotor of this invention.

The preparation of a rotor of this invention generally follows well-known manufacturing procedures for the production of circumferentially wrapped composite constructs. FIG. 3 is a generic schematic of the procedure. In FIG. 3, mandrel 30 has outside diameter 32 that is the same as desired inside diameter of the desired rotor precursor. Mandrel 30 is rotated about central axis 38 while fibers 40 are wound on the rotating mandrel from source reels 42 after passing through guide plate 50 and pay-out head 44. Pay-out head 44 moves parallel to rotating mandrel 30 at a speed that, in conjunction with the rotational speed of mandrel 30 results in fibers 40 being deposited on mandrel 30 at any desired angle α relative to central axis 38 as shown in FIG. 2. Fibers 40 may be wound dry and then coated with matrix material or they may be wet-wound by passing them through matrix bath 48, which contains the matrix material for the composite to be formed, prior to being deposited on mandrel 30. Depending on the desired volume percent fiber in the composite, wiper blade 49 may be used to remove excess matrix material from rotor precursor 36 after fibers 40 have been wound on mandrel 30.

With regard to the presently preferred thermoset polymeric matrix for a flywheel herein, mandrel 30 can be heated while fibers 40 are being wound thereon, the heat causing the polymer to cure and solidify. The heating of mandrel 30 may be accomplished using sliprings (not shown) on either end of the mandrel or by any other means known to those skilled in the art.

Mandrel 30 has a length that is substantially greater than the intended ultimate thickness of the rotors being manufactured which is why the product of the above discussed process is called a rotor precursor. Mandrels 30 inches in length are in regular use. Mandrels 8 feet long or longer are, however, contemplated. Once all of fibers 40 have been deposited and curing has been completed, rotor precursor 36 is removed from mandrel 30 and cut into lengths corresponding to the desired dimension/weight of rotors 10 being fabricated. Rotors 10 may have an outside diameter from a few inches to 40 inches or more which can result in rotors weighing, without limitation, from a few pounds to several hundred pounds or more.

As mentioned previously, rotors of this invention do not require the intricate balancing that virtually all non-composite rotors and most composite rotors require. Common problems with composite flywheels are poor consolidation of the fibers, delamination and fiber movement, sometimes referred to as fiber swimming (when fibers "float" in the matrix) or fiber buckling (when fiber kink during wrapping) in the matrix resin if too much uncured gel is deposited on the forming rotor. The instant invention addresses these problems in multiple ways. The continuous changing of the wrap angle assures that the stress on one region of the rotor that might lead to delamination is countered by strength in another region due to the differing wrap angle. Further, the use of previously discussed wiper blade 49 (FIG. 3) reduces the chances of fiber floating or buckling prior to curing of the matrix. Thus, rotors of this invention have been taken essentially as-is from a mandrel without balancing and used in flywheels for the storage of kinetic energy and release of electrical energy wherein the flywheels rotate at 25,000 rpm or greater. Substantially higher rotational speeds are expected to be achievable without straying from the teachings of this invention.

What is claimed:

1. A flywheel, comprising:
a composite annular rotor having a central axis of rotation perpendicular to the composite annular rotor, wherein:
the composite annular rotor comprises a matrix material in which fibers are embedded at a concentration of about 50% to 80% by volume, the fibers being helically wound at an initial angle of about 50° to about 80° relative to the axis of rotation, the winding angle increasing to about 90° in a continuous manner where the fibers comprise:
a single chemical composition within a first chemical class of fiber; or
variable chemical compositions within a first chemical class of fiber; or
a first chemical class of fiber, which may comprise a single chemical composition or variable chemical compositions, wound to a predetermined rotor dimension whereupon a second chemical class of fiber which may comprise a single chemical composition or variable chemical compositions, is introduced either gradually or all at once.

2. The flywheel of claim 1, comprising a hub at the axis of rotation, the hub being coupled to the composite annular rotor.

3. The flywheel of claim 2, wherein the hub is coupled to the composite annular rotor by a radially extending disc.

4. The flywheel of claim 2, wherein the hub is coupled to the composite annular rotor by a plurality of radially extending spokes.

5. The flywheel of claim 1, wherein the matrix material comprises a thermoplastic or a thermoset polymer.

6. The flywheel of claim 5, wherein the matrix material comprises a thermoset polymer selected from the group consisting of epoxy resins, polyurethanes, polyesters, polyimides, urea-formaldehyde resins 49-*r* and cyanate resins.

7. The flywheel of claim 1, wherein the first chemical class of fiber comprises fiberglass fiber.

8. The flywheel of claim 1, wherein the first chemical class of fiber comprises carbon fiber.

9. The flywheel of claim 1, wherein the first chemical class of fiber comprises fiberglass fiber and the second chemical class of fiber comprises carbon fiber.

10. The flywheel of claim 1, wherein the first chemical class of fiber comprises carbon fiber and the second chemical class of fiber comprises fiberglass fiber.

* * * * *